US008613517B2

(12) United States Patent
Huang (10) Patent No.: US 8,613,517 B2
(45) Date of Patent: Dec. 24, 2013

(54) ILLUMINATION SYSTEM AND PROJECTION DEVICE COMPRISING THE SAME

(75) Inventor: June-jei Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 205 days.

(21) Appl. No.: 13/051,214

(22) Filed: Mar. 18, 2011

(65) Prior Publication Data

US 2012/0075590 A1    Mar. 29, 2012

(30) Foreign Application Priority Data

Sep. 28, 2010 (TW) ............................... 99132759 A (51) Int. Cl.
*G03B 21/00* (2006.01)

(52) U.S. Cl.
USPC ............................................................ 353/31

(58) Field of Classification Search
USPC ............... 353/31, 84; 362/268, 555, 286, 551
See application file for complete search history.

(56) References Cited

U.S. PATENT DOCUMENTS

| 2002/0048000 | A1  |   | 4/2002  | Nishida et al. |         |
|--------------|-----|---|---------|----------------|---------|
| 2005/0174775 | A1  | * | 8/2005  | Conner         | 362/268 |
| 2007/0081336 | A1  | * | 4/2007  | Bierhuizen et al. | 362/293 |
| 2009/0034284 | A1  | * | 2/2009  | Li et al.      | 362/554 |
| 2010/0283977 | A1  | * | 11/2010 | Wang et al.    | 353/84  |

FOREIGN PATENT DOCUMENTS

| CN | 1918498   | 2/2007 |
| CN | 101122674 | 2/2008 |
| CN | 101836160 | 9/2010 |
| JP | H7-151966 | 6/1995 |
| JP | 2005-173019 | 6/2005 |
| KR | 1020060129449 | 12/2006 |
| TW | 200604466 | 2/2006 |
| TW | 200639429 | 11/2006 |
| TW | 200642452 | 12/2006 |

OTHER PUBLICATIONS

Office Action from corresponding Chinese Appln. No. 201010503600.1 dated Mar. 18, 2013. Summary English translation attached.
Office Action from corresponding Taiwanese Appln. No. 099132759 dated Jun. 21, 2013. Summary English translation attached.

* cited by examiner

*Primary Examiner* — Thanh Luu
*Assistant Examiner* — Danell L Owens
(74) *Attorney, Agent, or Firm* — Grossman, Tucker, Perreault & Pfleger, PLLC (57) ABSTRACT

An illumination system and a projection device comprising the same are provided. The illumination system comprises a main optical axis, a light source, a wheel, an optical device, a first wavelength transformer and a first angle selective film. The light source is adapted to provide a light beam advancing along the main optical axis. The wheel is adapted to rotate according to a control signal. The optical device comprises a first lens, a second lens and a third lens sequentially disposed between the light source and the wheel along the main optical axis. The optical device is adapted to converge the light beam to a focused position on the wheel. The first wavelength transformer is disposed on the wheel for receiving and transforming the light beam into a first wavelength light. The first angle selective film is adapted to angle-selectively filter the first wavelength light, and is disposed on the first wavelength transformer. The first wavelength transformer is disposed between the light source and the first angle selective film.

17 Claims, 7 Drawing Sheets

ILLUMINATION SYSTEM AND PROJECTION DEVICE COMPRISING THE SAME

This application claims the benefit of the priority based on Taiwan Patent Application No. 099132759 filed on Sep. 28, 2010, the disclosures of which are incorporated herein by reference in their entirety.

CROSS-REFERENCES TO RELATED APPLICATIONS

Not applicable.

BACKGROUND OF THE INVENTION

1. Field of the Invention

The present invention provides an illumination system for use in a projection device.

2. Descriptions of the Related Art

Light emitting diodes (LEDs) are gradually replacing ultra high pressure (UHP) mercury bulbs as light sources of projection devices because of the LEDs providing high efficiency in energy transformation, high degree of stability, long service life, capability of being instantaneously switched on/off and the like. When LEDs are adopted as the light source of a projection device, the design and arrangement of the optical elements thereof need to be considered to obtain a satisfactory light utilization ratio and satisfactory light distribution uniformity. A common approach is to directly use red LEDs, blue LEDs and green LEDs as the light source of the projection device, and lights of the LEDs are outputted after being optically coupled. However, it is known that green LEDs have a low light emission efficiency, while red LEDs have a high demand on heat dissipation, so if the red LEDs, the blue LEDs and the green LEDs are used as the light source of the projection device directly, then the quantities, arrangement and heat dissipation manners of the red LEDs, the blue LEDs and the green LEDs have to be adjusted appropriately to facilitate the adjustment of the color uniformity as a whole.

Furthermore, the LEDs per se are known as a kind of light source with both a large divergence angle and large etendue. Hence, if the etendue thereof cannot be reduced for more effective use of light, problems such as inadequate projection luminance of the projection device and failure to make the efficient use of light energy emitted from the LED will also arise.

In view of this, an urgent need exists in the art to provide a solution that can make efficient use of light energy generated by the LED to increase the efficiency of utilization of light by the projection device and improve the projection luminance of the projection device as a whole.

SUMMARY OF THE INVENTION

An objective of the present invention is to provide an illumination system and a projection device comprising the illumination system, which can make efficient use of light energy generated by an LED to increase the utilization efficiency of light and to effectively improve the projection luminance of the projection device.

To achieve the aforesaid objective, the present invention provides an illumination system. The illumination system comprises a main optical axis, a light source, a wheel, an optical device, a first wavelength transformer and a first angle selective film. The light source provides a light beam advancing along the main optical axis. The wheel rotates according to a control signal. The optical device comprises a first lens, a second lens and a third lens sequentially disposed between the light source and the wheel along the main optical axis to converge the light beam to a focused position on the wheel. The first wavelength transformer is disposed on the wheel for receiving and transforming the light beam into a first wavelength light. The first angle selective film is disposed on the first wavelength transformer. The first wavelength transformer is located between the light source and the first angle selective film, while the first angle selective film angle-selectively filters the first wavelength light.

Another objective of the present invention is to provide a projection device. The projection device comprises the aforesaid illumination system and an imaging system. The imaging system receives and processes an output light source provided by the illumination system to form an image.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
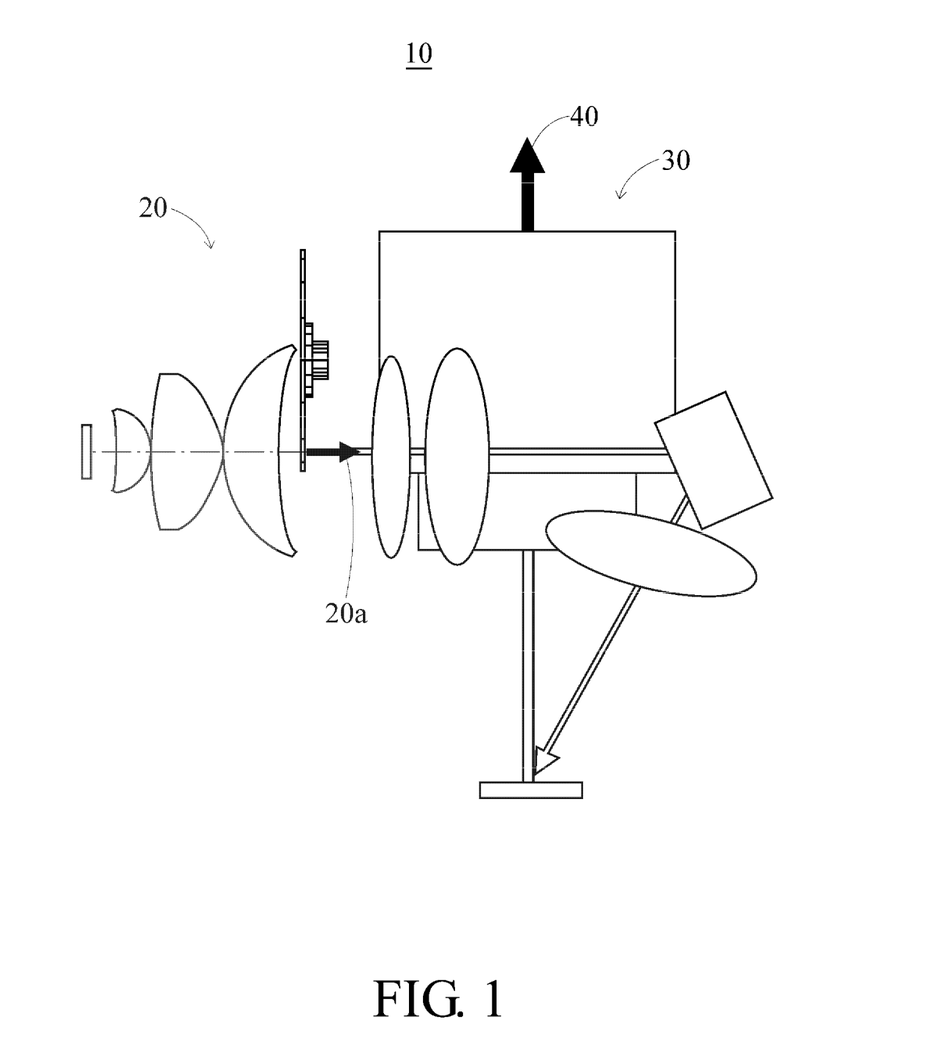
FIG. 1 is a schematic view of a projection device of the present invention.

As shown in FIG. 1, a projection device 10 of the present invention comprises an illumination system 20 and an imaging system 30. The illumination system 20 of the present invention is adapted to provide an output light source 20a. In the imaging system 30, a device such as a digital micromirror device (DMD) may be used for receiving and processing the output light source 20a to form and project an image 40 outwards.

Figure 2A:
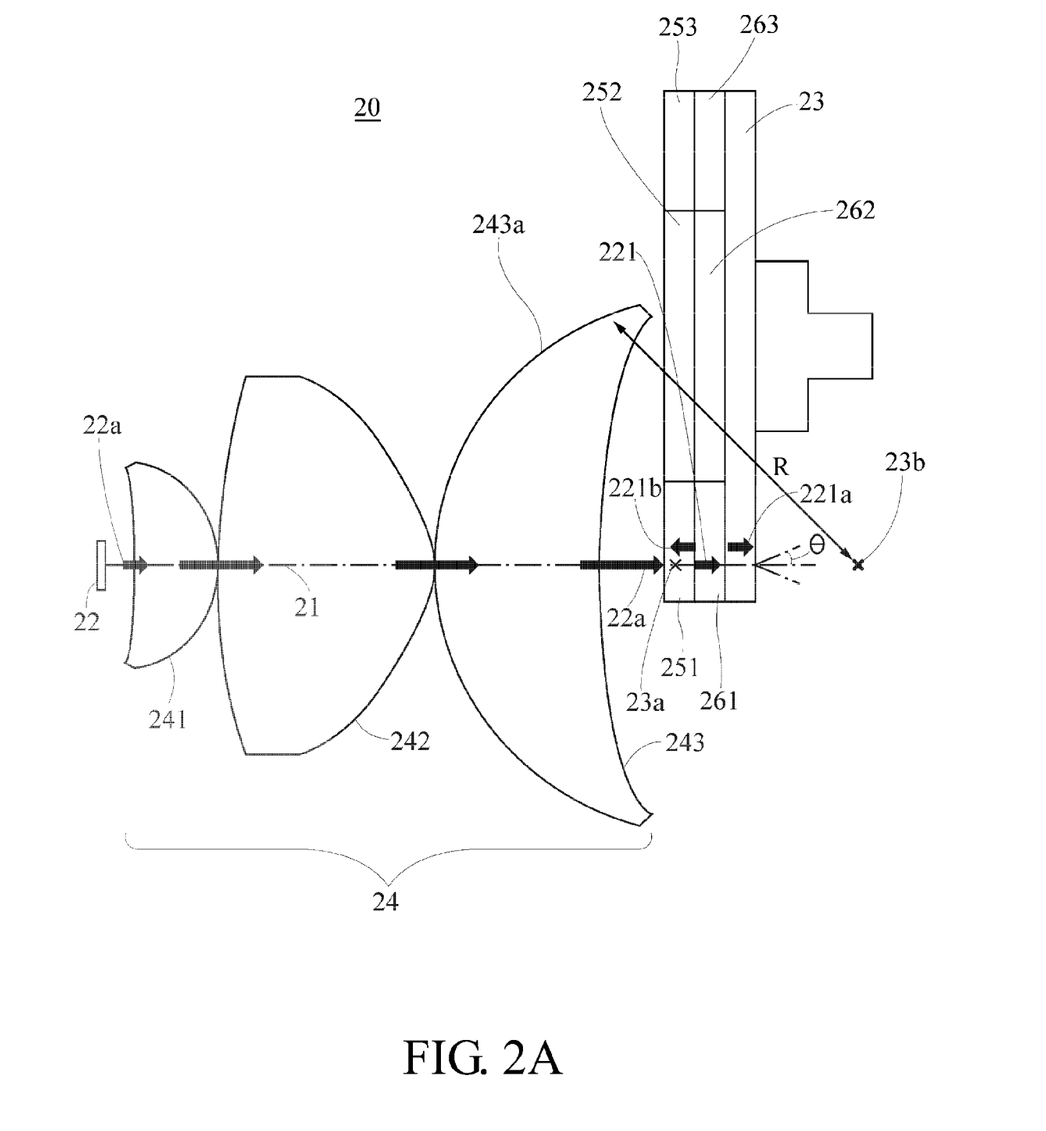
FIG. 2A to FIG. 2C are schematic views of an illumination system according to the first embodiment of the present invention.

As shown in FIG. 2A, the illumination system 20 of the present invention at least comprises a main optical axis 21, a light source 22, a wheel 23, an optical device 24, a first wavelength transformer 251 and a first angle selective film 261. A light beam 22a provided by the light source 22 travels along the main optical axis 21, and the wheel 23 rotates according to a control signal. The optical device 24 comprises a first lens 241, a second lens 242 and a third lens 243, which are sequentially disposed between the light source 22 and the wheel 23 along the main optical axis 21 for converging the light beam 22a to a focused position 23a on the wheel 23. The first wavelength transformer 251 is disposed on the wheel 23. The first angle selective film 261 is disposed on the first wavelength transformer 251, and the first wavelength transformer 251 is located between the light source 22 and the first angle selective film 251. Here, it shall be appreciated that for the ease of explaining the optical statuses of the light beam 22a in the wavelength transformer and the angle selective film, the attached drawings are not depicted according to the actual scale of the individual components.

As shown in FIG. 2A, in the first preferred embodiment of the present invention, the first lens 241 of the optical device 24 has a concave surface and a convex surface, the second lens 242 has a convex surface and another convex surface, and the third lens 243 has a convex surface and a concave surface. The light beam 22a, after being emitted from the light source 22, sequentially travels through the concave surface and the convex surface of the first lens 241, the convex surface and the another convex surface of the second lens 242, and the convex surface and the concave surface of the third lens 243 before converging onto the wheel 23. The light beam 22a with a large divergence angle generated by the light source 22 (e.g., an LED) is fully collected by the concave surface of the first lens 241, and then is converged to the focused position 23a on the wheel 23 by the first lens 241, the second lens 242 and the third lens 243 of the optical device 24.

When the wheel 23 rotates according to the control signal to locate the first wavelength transformer 251 at the focused position 23a, the first wavelength transformer 251 receives the light beam 22a and transforms the light beam 22a into a first wavelength light 221. At this point, the first angle selective film 261 angle-selectively filters the first wavelength light 221 transformed by the first wavelength transformer 251 so that the first wavelength light 221 comprises a first portion 221a and a second portion 221b. The first portion 221a of the first wavelength light 221 defines a first included angle with respect to the main optical axis 21, wherein the first included angle is less than a predetermined angle θ. Thus, the first portion 221a of the first wavelength light 221 travels through the first angle selective film 261 and the wheel 23 to enter into the imaging system 30 shown in FIG. 1 for processing. Oppositely, the second portion 221b of the first wavelength light 221 defines a second included angle with respect to the main optical axis 21, wherein the second included angle is larger than the predetermined angle θ. Thus, the second portion 221b of the first wavelength light 221 is reflected by the first angle selective film 261. Thereby, the divergence angle and etendue of the output light source 20a that enters into the imaging system 30 can be restricted significantly so that the imaging system 30 can make full use of the output light source 20a provided by the illumination system 20 to form the image 40. As a result, the utilization efficiency of the light source is increased and the projection luminance of the projection device 10 is effectively improved.

Furthermore, the optical device 24 further comprises a dichroic layer 243a. In this embodiment, the dichroic layer 243a is disposed on the third lens 243 and located between the second lens 242 and the third lens 243. Because of its characteristics thereof, the dichroic layer 243a allows the light beam 22a to pass therethrough but reflects the first wavelength light 221. When the light beam 22a is emitted from the light source 22 and sequentially travels through the first lens 241 and the second lens 242 to reach the dichroic layer 243a, the dichroic layer 243a allows the light beam 22a to pass therethrough and reach the first wavelength transformer 251 on the wheel 23. After the light beam 22a is received and transformed into the first wavelength light 221 by the first wavelength transformer 251, the second portion 221b, which is reflected by the first angle selective film 261, of the first wavelength light 221 re-enters into the third lens 243 and reaches the dichroic layer 243a. At this point, the dichroic layer 243a reflects the second portion 221b of the first wavelength light 221 so that the second portion 221b re-enters into the first wavelength transformer 251.

In other words, through the disposition of the dichroic layer 243a, the second portion 221b, which is reflected by the first angle selective film 261, of the first wavelength light 221 can be reflected back into the first wavelength transformer 251 and then angle-selectively filtered again by the first angle selective film 261. Thereby, the loss of light caused when the light beam 22a travels through the illumination system 20 is reduced, and meanwhile, the etendue of the output light source 20a outputted by the illumination system 20 is also reduced significantly. Thus, the utilization efficiency of the light source is further increased, and the projection luminance of the projection device 10 is improved effectively.

It shall be noted that in the present invention, the dichroic layer 243a is preferably formed onto a curved surface, which has a curvature radius R. The light beam 22a passes through the optical device 24 to focus on the focused position 23a, the dichroic layer 243a is capable of reflecting light from the focused position 23a to an imaging position 23b, and a distance between the imaging position 23b and the dichroic layer 243a is substantially equal to the curvature radius R of the dichroic layer 243a. Therefore, the light emitted from the focused position 23a reaches the dichroic layer 243a in an orthogonal way. When the first wavelength transformer 251 is located at the focused position 23a, the second portion 221b, which is reflected by the first angle selective film 261, of the first wavelength light 221 is orthogonally reflected by the dichroic layer 243a without any loss, and then re-enters into the first wavelength transformer 251.

In this embodiment, the second lens 242 is preferably an aspheric lens made of plastic, while the first lens 241 and the third lens 243 are made of glass. The first wavelength transformer 251 is selected from a group consisting of a red phosphor and green phosphor, so that the first wavelength light 221 is a red light or green light.

Figure 2B:
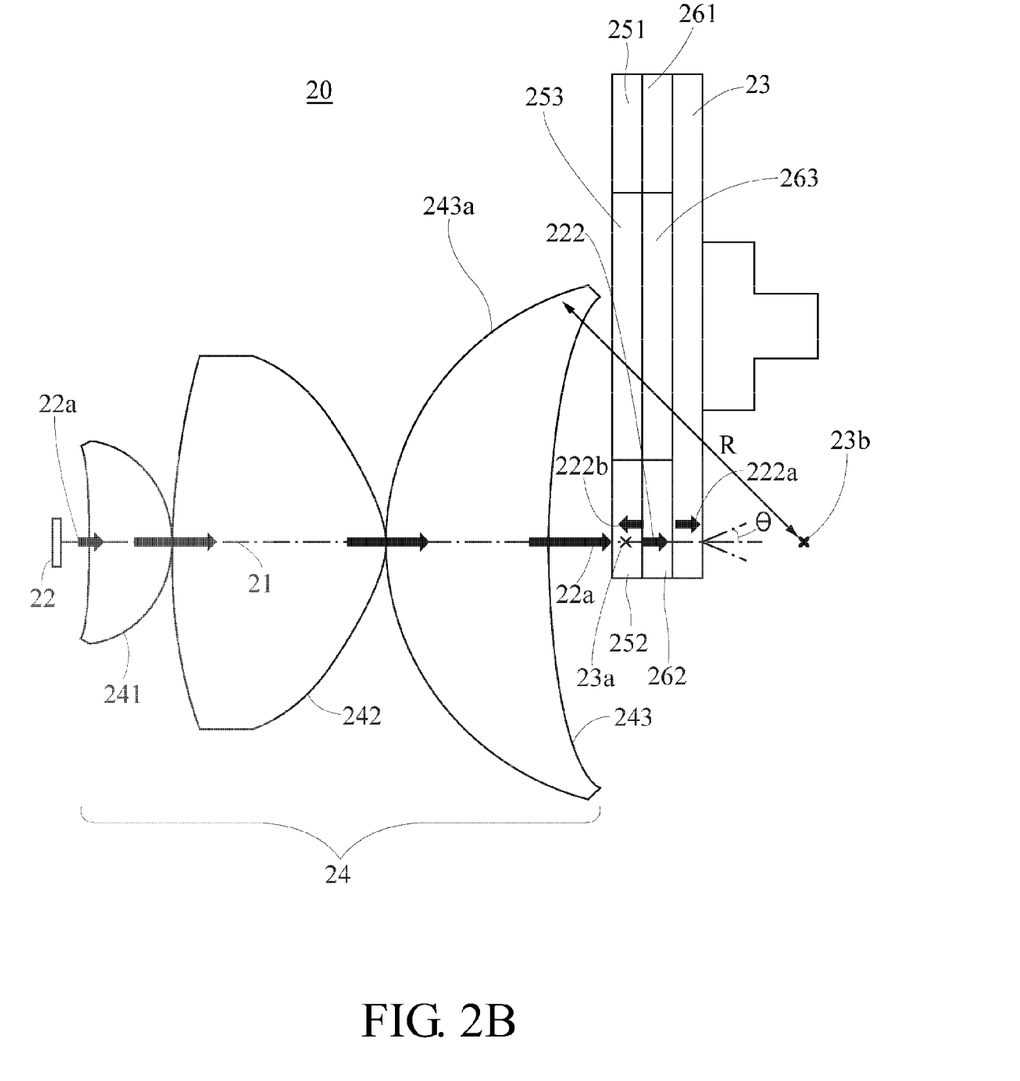
Figure 2C:
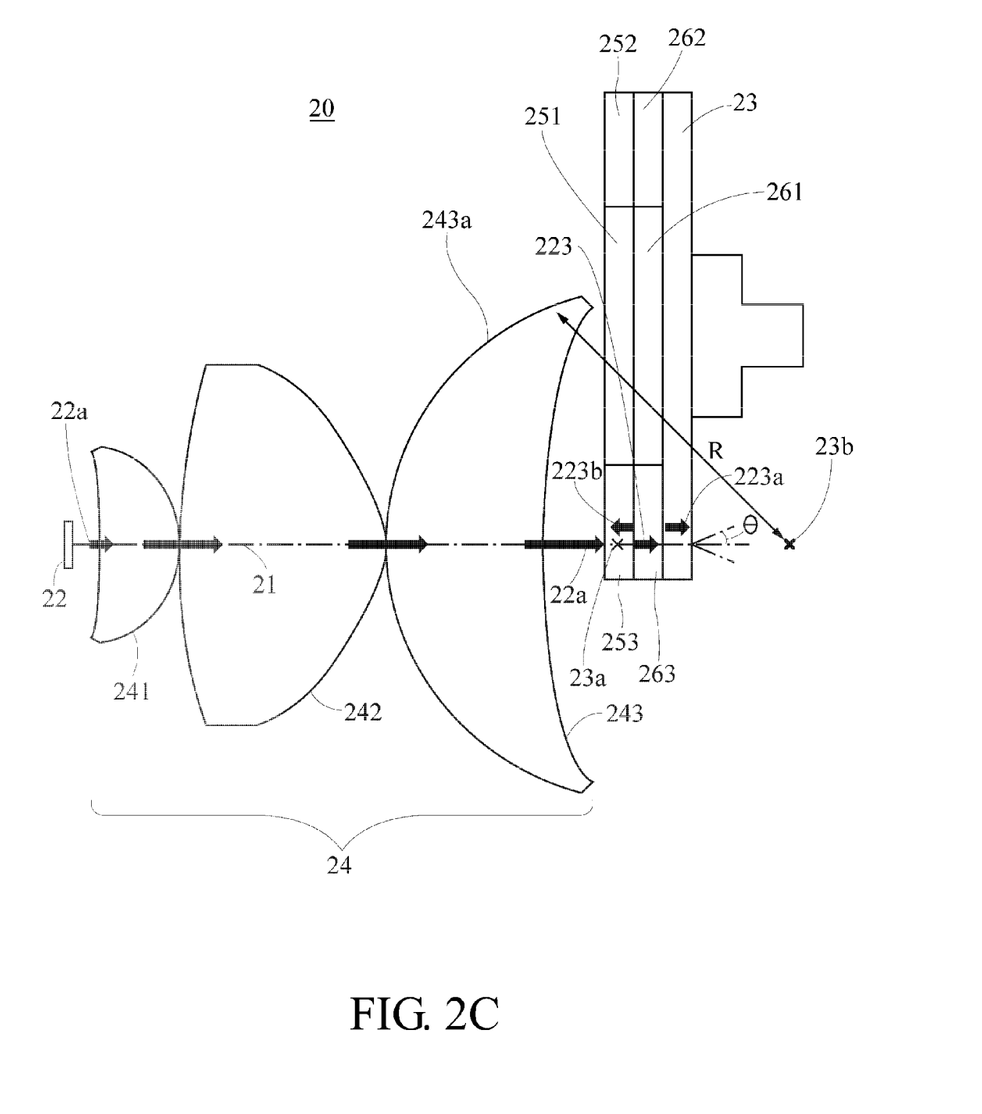

Expanding upon the above, in the first embodiment, the illumination system 20 further comprises a second wavelength transformer 252, a third wavelength transformer 253, a second angle selective film 262 and a third angle selective film 263; and similar to the first wavelength transformer 251, the second wavelength transformer 252 and the third wavelength transformer 253 are both disposed on the wheel 23.

In detail, as shown in FIG. 2B, the second angle selective film 262 is disposed on the second wavelength transformer 252 that is disposed between the light source 22 and the second angle selective film 262. Similar to the first wavelength transformer 251, when the wheel 23 rotates according to the control signal to locate the second wavelength transformer 252 at the focused position 23a, the second wavelength transformer 252 receives the light beam 22a and transforms the light beam 22a into a second wavelength light 222. At this point, the second angle selective film 262 angle-selectively filters the second wavelength light 222 transformed by the second wavelength transformer 252 so that the second wavelength light 222 comprises a first portion 222a and a second portion 222b. The first portion 222a of the second wavelength light 222 defines a third included angle with respect to the main optical axis 21, wherein the third included angle is less than the predetermined angle θ. Thus, the first portion 222a of the second wavelength light 222 travels through the second angle selective film 262 and enters into the imaging system 30. The second portion 222b of the second wavelength light 222 defines a forth included angle with respect to the main optical axis 21, wherein the forth included angle is larger than the predetermined angle θ. Thus, the second portion 222b of the second wavelength light 222 is reflected by the second angle selective film 262.

Similarly, as shown in FIG. 2C, the third angle selective film 263 is disposed on the third wavelength transformer 253 that is disposed between the light source 22 and the third angle selective film 263. Similar to the first wavelength transformer 251 and the second wavelength transformer 252, when the wheel 23 rotates according to the control signal to locate the third wavelength transformer 253 at the focused position 23a, the third wavelength transformer 253 receives the light beam 22a and transforms the light beam 22a into a third wavelength light 223. At this point, the third angle selective film 263 angle-selectively filters the third wavelength light 223 transformed by the third wavelength transformer 253 so that the third wavelength light 223 comprises a first portion 223a and a second portion 223b. The first portion 223a of the third wavelength light 223 defines a fifth included angle with respect to the main optical axis 21, wherein the fifth included angle is less than the predetermined angle θ. Thus, the first portion 223a of the third wavelength light 223 travels through the third angle selective film 263 and enters into the imaging system 30. The second portion 223b of the third wavelength light 223 defines a sixth included angle with respect to the main optical axis 21, wherein the sixth included angle is larger than the predetermined angle θ. Thus, the second portion 223b of the third wavelength light 223 is reflected by the third angle selective film 263.

Figure 3:
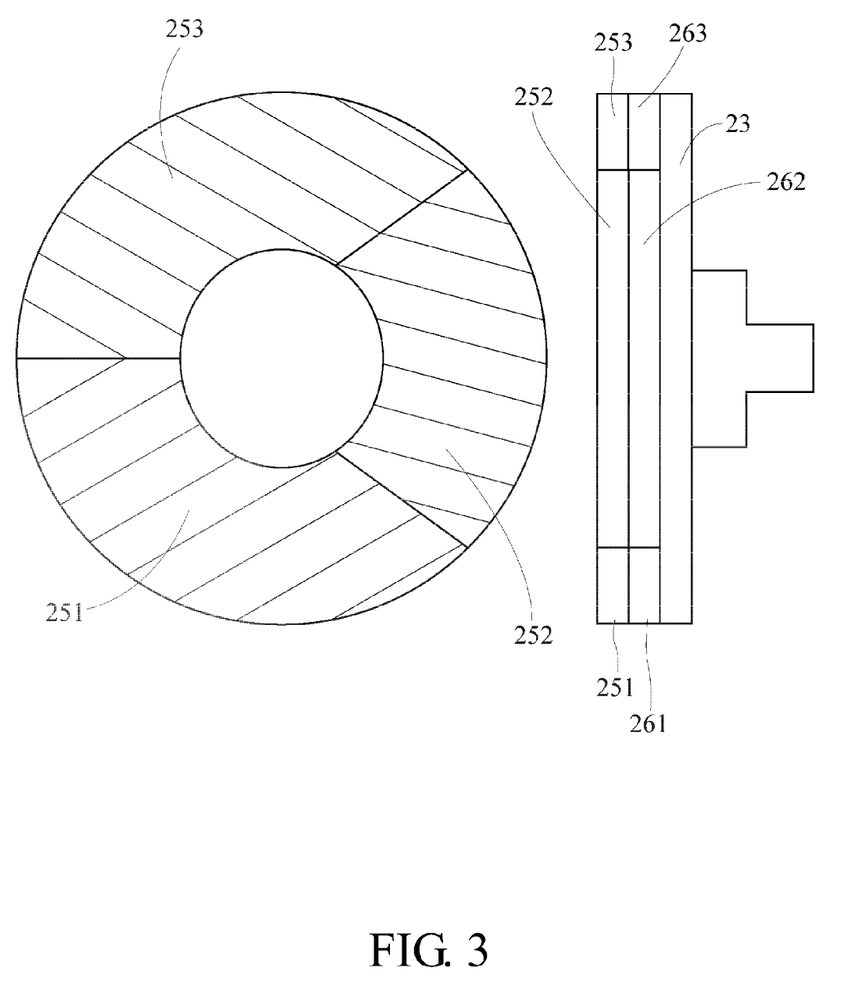
FIG. 3 is a schematic view of a wheel according to the first embodiment of the present invention.

As shown in FIG. 3, the first wavelength transformer 251, the second wavelength transformer 252 and the third wavelength transformer 253 are proportionally disposed on the wheel 23 to transform light of respective corresponding wavelengths for use in the imaging system 30 of the projection device 10. In this case, the wheel 23 rotates according to the control signal for the first wavelength transformer 251, the second wavelength transformer 252 and the third wavelength transformer 253 to locate at the focused position 23a in turn.

In the first embodiment, the dichroic layer 243a allows the light beam 22a generated by the light source 22 to pass therethrough, and reflects the first wavelength light 221 transformed by the first wavelength transformer 251 after receiving the light beam 22a, the second wavelength light 222 transformed by the second wavelength transformer 252 after receiving the light beam 22a and the third wavelength light 223 transformed by the third wavelength transformer 253 after receiving the light beam 22a. Thereby, when the first wavelength transformer 251, the second wavelength transformer 252 and the third wavelength transformer 253 are located at the focused position 23a in turn, the second portions 221b, 222b, 223b, which are reflected by the first angle selective film 261, the second angle selective film 262 and the third angle selective film 263 respectively, of the first wavelength light 221, the second wavelength light 222 and the third wavelength light 223 are orthogonally reflected by the dichroic layer 243a without any loss, and then re-enter into the first wavelength transformer 251, the second wavelength transformer 252 and the third wavelength transformer 253 respectively.

To keep the etendue and luminance of the projection device optimal, the aforesaid predetermined angle θ should be substantially 25 degrees. In this embodiment, the second wavelength transformer 252 is selected from a group consisting of a red phosphor and a green phosphor, and is distinct from the first wavelength transformer 251. In other words, if the first wavelength transformer 251 is the red phosphor, then the second wavelength transformer 252 is the green phosphor; on the other hand, if the first wavelength transformer 251 is the green phosphor, then the second wavelength transformer 252 is the red phosphor. Correspondingly, the first wavelength light 221 and the second wavelength light 222 are a red light and a green light respectively to provide the imaging system 30 of the projection device 10 with the red light and green light. Furthermore, in this embodiment, the light source 22 should be an ultraviolet (UV) LED, while the third wavelength transformer 253 is a blue phosphor. Thereby, the UV light emitted from the light source 22 can excite the third wavelength transformer 253 to generate a blue light (i.e., the third wavelength light 223) to the imaging system 30 of the projection device 10.

Figure 2D:
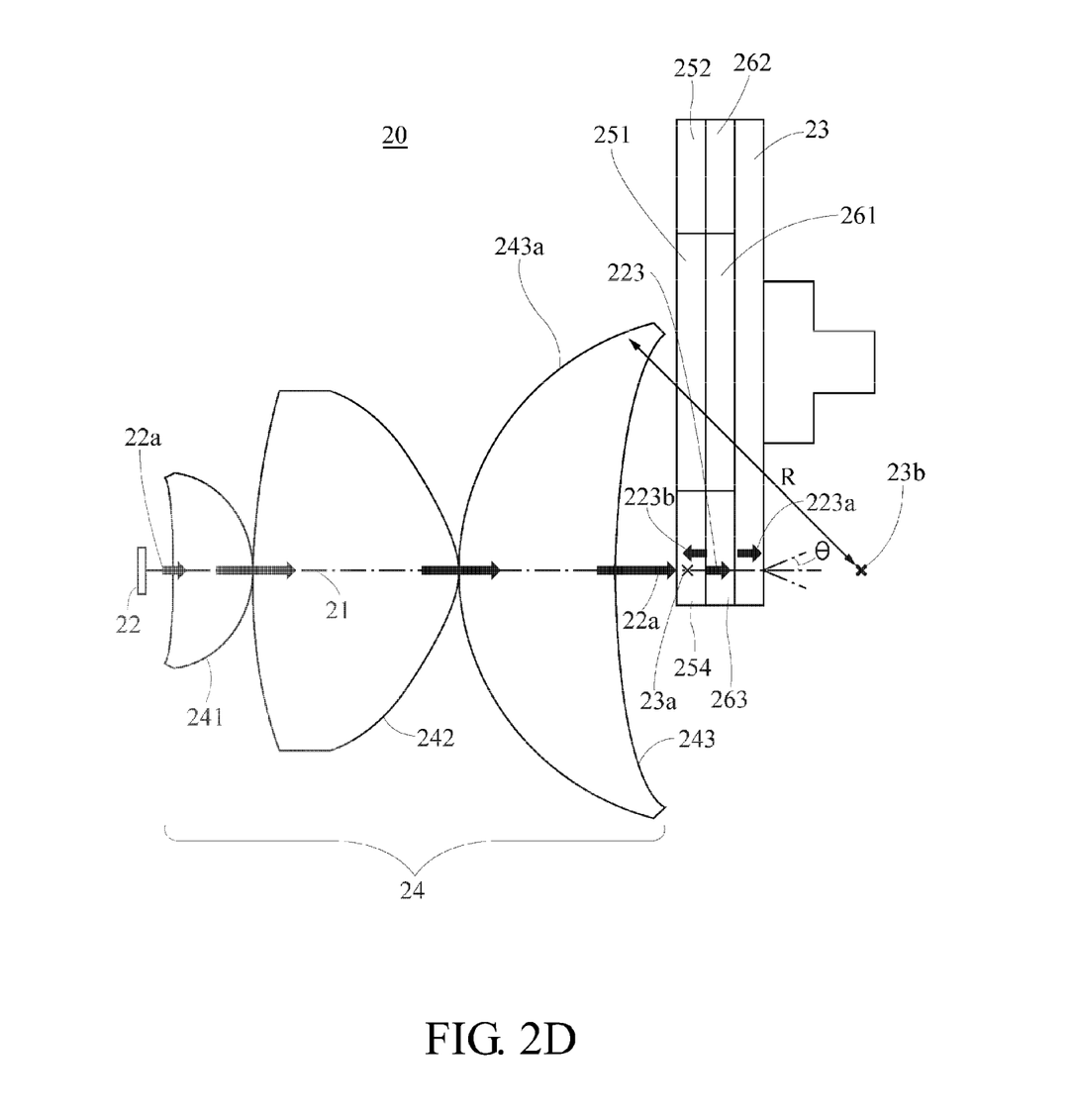
FIG. 2D is a schematic view of an illumination system according to the second embodiment of the present invention.
Figure 4:
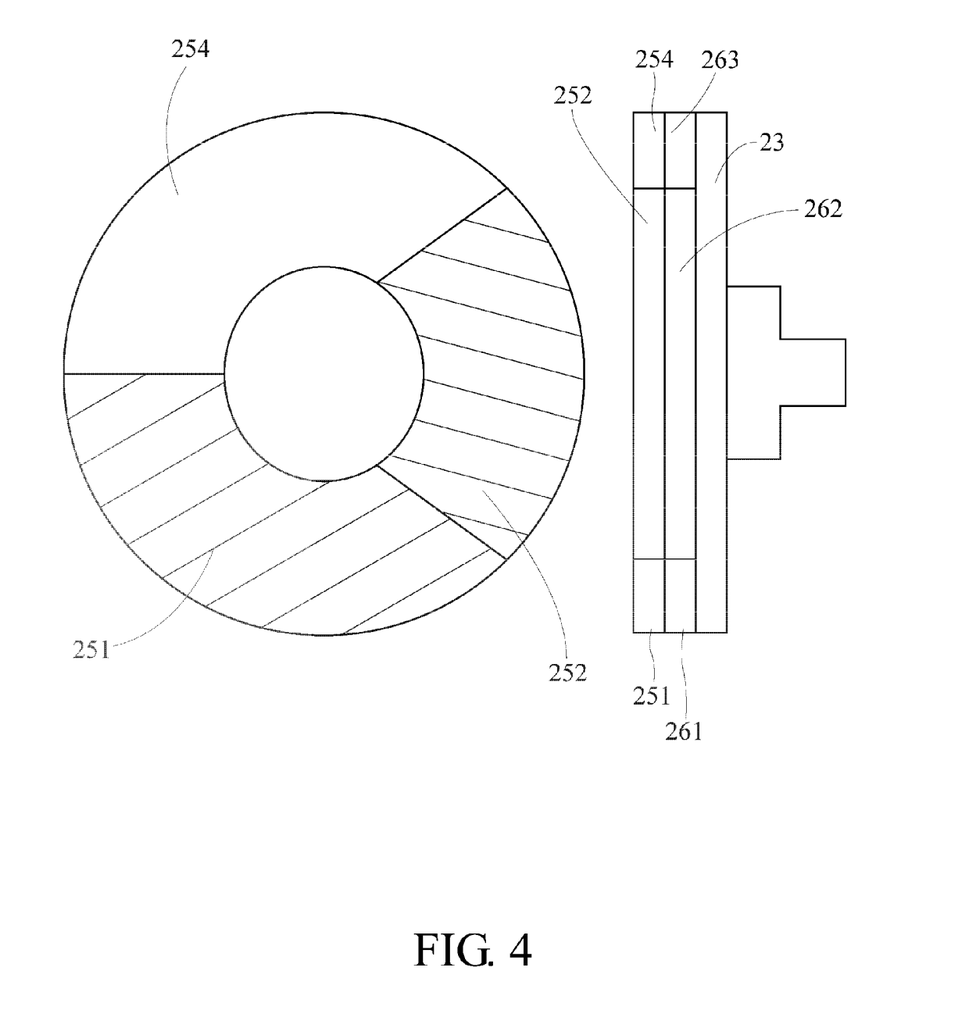
FIG. 4 is a schematic view of a wheel according to the second embodiment of the present invention.

FIGS. 2D and 4 illustrate the second embodiment of the illumination system 20 of the present invention. Similar to the first embodiment, the illumination system 20 of the second embodiment also comprises the main optical axis 21, the light source 22, the wheel 23, the optical device 24, the first wavelength transformer 251, the second wavelength transformer 252, the first angle selective film 261, the second angle selective film 262 and the third angle selective film 263. However, the second embodiment differs from the first embodiment in that the third wavelength transformer 253 disposed on the wheel 23 in the first embodiment is replaced by a transparent portion 254. Moreover, in the second embodiment, the light beam 22a provided by the light source 22 is the third wavelength light 223, and travels through the dichroic layer 243a and the transparent portion 254 of this embodiment.

In detail, as shown in FIG. 2D, in the second embodiment, the third angle selective film 263 is disposed on the transparent portion 254, and the transparent portion 254 is located between the third angle selective film 263 and the optical device 24. In this embodiment, the wheel 23 rotates according to the control signal for the first wavelength transformer 251, the second wavelength transformer 252 and the transparent portion 254 to locate at the focused position 23a in turn. When the wheel 23 rotates according to the control signal to locate the transparent portion 254 at the focused position 23a, the light beam 22a of the third wavelength light 223 travels through the dichroic layer 243a, then focuses, by means of the optical device 24, onto the transparent portion 254 located at the focused position 23a, and travels through the transparent portion 254 to reach the third angle selective film 263. The third angle selective film 263 filters the third wavelength light 223 into at least a first portion 223a and a second portion 223b. The first portion 223a of the third wavelength light 223 defines a fifth included angle with respect to the main optical axis 21, wherein the fifth included angle is less than the predetermined angle θ. Thus, the first portion 223a of the third wavelength light 223 travels through the third angle selective film 263 to be emitted outwards. The second portion 223b of the third wavelength light 223 defines a sixth included angle with respect to the main optical axis 21, wherein the sixth included angle is larger than the predetermined angle θ. Thus, the second portion 223b of the third wavelength light 223 is reflected by the third angle selective film 263.

Because the third wavelength transformer 253 disposed on the wheel 23 in the first embodiment is replaced by the transparent portion 254 in the second embodiment, a blue LED can be used directly in the light source 22 of this embodiment, and a blue light from the blue LED can replace the third wavelength light 223 transformed by the third wavelength transformer 253 of the first embodiment and travel through the transparent portion 254 into the third angle selective film 263 directly. Thus, the third wavelength transformer 253 can be omitted. Likewise, to keep the etendue and projection luminance of the projection device 10 optimal, the aforesaid predetermined angle θ should also be substantially 25 degrees.

Besides the aforesaid differences, the positional relationships among the main optical axis 21, the light source 22, the wheel 23, the optical device 24, the first wavelength transformer 251, the first angle selective film 261, the second wavelength transformer 252 and the second angle selective film 262 as well as the objective to be accomplished in the second embodiment are all the same as those of the first embodiment, so no further description will be made thereon herein.

According to the above descriptions, through the disposition of the particular optical devices (the first lens, the second lens and the third lens), the illumination system of the present invention converges a light beam, which is emitted from a light source (e.g., an LED) with a large divergence angle and etendue, to excite the wavelength transformers disposed on an optical wheel to generate a red light, a blue light and a green light for use by the projection device. If the light source that is being used is a light source with high exciting energy, then the first wavelength transformer, the second wavelength transformer and the third wavelength transformer as well as the first angle selective film, the second angle selective film and the third angle selective film corresponding thereto are disposed on the optical wheel respectively. On the other hand, if the light source that is being used emits the third wavelength light directly, then the first wavelength transformer, the second wavelength transformer and the transparent portion as well as the first angle selective film, the second angle selective film and the third angle selective film corresponding thereto are disposed on the optical wheel respectively. Thereby, both the first embodiment and the second embodiment can converge the divergent light beam generated by the light source and reduce the etendue of the light beam and, meanwhile, improve the luminance.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An illumination system for use in a projection device, the illumination system comprising:
    a main optical axis;
    a light source providing a light beam advancing along the main optical axis;
    a wheel rotating according to a control signal;
    an optical device comprising a first lens, a second lens a third lens and a dichroic layer, the first lens, the second lens and the third lens are sequentially disposed between the light source and the wheel along the main optical axis so as to converge the light beam to a focused position on the wheel;
    a first wavelength transformer disposed on the wheel for receiving and transforming the light beam into a first wavelength light; and
    a first angle selective film disposed on the first wavelength transformer, wherein the first wavelength transformer is located between the light source and the first angle selective film, and the first angle selective film angle-selectively filters and reflects the first wavelength light;
    wherein the dichroic layer allowing the light beam generated from the light source to pass therethrough and reflecting the first wavelength light, and the dichroic layer is formed into a curved surface having a curvature radius, the main optical axis that passes through a portion of the optical device and the focus position has an imaging position, and a distance between the imaging position and the dichroic layer is substantially equal to the curvature radius of the dichroic layer.

2. The illumination system as claimed in claim 1, wherein the light beam from the light source to the wheel sequentially travels through a concave surface and a convex surface of the first lens, a convex surface and another convex surface of the second lens, and a convex surface and a concave surface of the third lens.

3. The illumination system as claimed in claim 2, wherein the first wavelength light comprises a first portion and a second portion, wherein the first portion of the first wavelength light defines a first included angle with respect to the main optical axis, and the second portion of the first wavelength light defines a second included angle with respect to the main optical axis, wherein the first included angle is less than a predetermined angle so that the first portion of the first wavelength light travels through the first angle selective film, and the second included angle is larger than the predetermined angle so that the second portion of the first wavelength light is reflected by the first angle selective film.

4. The illumination system as claimed in claim 1, wherein the dichroic layer is disposed on the third lens and located between the second lens and the third lens.

5. The illumination system as claimed in claim 4, wherein the second lens is an aspheric lens made of plastic, and the first lens and the third lens are made of glass.

6. The illumination system as claimed in claim 1, wherein the first wavelength transformer is selected from a group consisting of a red phosphor and a green phosphor.

7. The illumination system as claimed in claim 1, further comprising:
    a second wavelength transformer disposed on the wheel for receiving and transforming the light beam into a second wavelength light, wherein the dichroic layer reflects the second wavelength light, and the wheel rotates according to the control signal for the first wavelength transformer and the second wavelength transformer to locate at the focused position in turn; and
    a second angle selective film disposed on the second wavelength transformer, wherein the second wavelength transformer is located between the light source and the second angle selective film, the second wavelength light comprises a first portion and a second portion, wherein the first portion of the second wavelength light defines a third included angle with respect to the main optical axis, and the second portion of the second wavelength light defines a forth included angle with respect to the main optical axis, wherein the third included angle is less than the predetermined angle so that the first portion of the second wavelength light travels through the second angle selective film, and the forth included angle is larger than the predetermined angle so that the second portion of the second wavelength light is reflected by the second angle selective film.

8. The illumination system as claimed in claim 7, wherein the second wavelength transformer is selected from a group consisting of a red phosphor and a green phosphor, and the second wavelength transformer is distinct from the first wavelength transformer.

9. The illumination system as claimed in claim 1, further comprising:
    a third wavelength transformer disposed on the wheel for receiving and transforming the light beam into a third wavelength light, wherein the dichroic layer reflects the third wavelength light, and the wheel rotates according to the control signal for the first wavelength transformer and the third wavelength transformer to locate at the focused position in turn; and a third angle selective film disposed on the third wavelength transformer, wherein the third wavelength transformer is located between the light source and the third angle selective film, the third wavelength light comprises a first portion and a second portion, wherein the first portion of the third wavelength light defines a fifth included angle with respect to the main optical axis, and the second portion of the third wavelength light defines a sixth included angle with respect to the main optical axis, wherein the fifth included angle is less than the predetermined angle so that the first portion of the third wavelength light travels through the third angle selective film, and the sixth included angle is larger than the predetermined angle so that the second portion of the third wavelength light is reflected by the third angle selective film.

10. The illumination system as claimed in claim 9, wherein the light source is an ultraviolet light emitting diode (UV LED).

11. The illumination system as claimed in claim 9, wherein the third wavelength transformer is a blue phosphor.

12. The illumination system as claimed in claim 3, wherein:
the wheel further comprises a transparent portion, when the light beam is a third wavelength light passing through the dichroic layer and the transparent portion, wherein the wheel rotates according to the control signal for the first wavelength transformer and the transparent portion to locate at the focused position in turn; and
the illumination system further comprises a third angle selective film disposed on the transparent portion which is located between the third angle selective film and the optical device, wherein the third wavelength light comprises a first portion and a second portion, wherein the first portion of the third wavelength light defines a fifth included angle with respect to the main optical axis, and the second portion of the third wavelength light defines a sixth included angle with respect to the main optical axis, wherein the fifth included angle is less than the predetermined angle so that the first portion of the third wavelength light travels through the third angle selective film, and the sixth included angle is larger than the predetermined angle so that the second portion of the third wavelength light is reflected by the third angle selective film.

13. The illumination system as claimed in claim 12, wherein the light source is a blue light emitting diode (blue LED).

14. The illumination system as claimed in claim 1, wherein the first angle selective film angle-selectively filters and reflects the first wavelength light into a first and at least a second portion, wherein the first portion of the first wavelength light defines a first included angle with respect to the main optical axis, and wherein the first included angle is less than 25 degrees.

15. A projection device, comprising:
an illumination system providing an output light source, said illumination system comprising:
a main optical axis;
a light source providing a light beam advancing along the main optical axis;
a wheel rotating according to a control signal;
an optical device comprising a first lens, a second lens a third lens and a dichroic layer, the first lens, the second lens and the third lens are sequentially disposed between the light source and the wheel along the main optical axis so as to converge the light beam to a focused position on the wheel;
a first wavelength transformer disposed on the wheel for receiving and transforming the light beam into a first wavelength light; and
a first angle selective film disposed on the first wavelength transformer, wherein the first wavelength transformer is located between the light source and the first angle selective film, and the first angle selective film angle-selectively filters and reflects the first wavelength light;
wherein the dichroic layer allowing the light beam generated from the light source to pass therethrough and reflecting the first wavelength light, and the dichroic layer is formed into a curved surface having a curvature radius, the main optical axis that passes through a portion of the optical device and the focus position has an imaging position, and a distance between the imaging position and the dichroic layer is substantially equal to the curvature radius of the dichroic layer; and
an imaging system receiving and processing the output light source to form an image.

16. The projection device as claimed in claim 15, wherein the illumination system further comprises:
a second wavelength transformer disposed on the wheel for receiving and transforming the light beam into a second wavelength light, wherein the dichroic layer reflects the second wavelength light, and the wheel rotates according to the control signal for the first wavelength transformer and the second wavelength transformer to locate at the focused position in turn; and
a second angle selective film disposed on the second wavelength transformer, wherein the second wavelength transformer is located between the light source and the second angle selective film, the second wavelength light comprises a first portion and a second portion, wherein the first portion of the second wavelength light defines a third included angle with respect to the main optical axis, and the second portion of the second wavelength light defines a forth included angle with respect to the main optical axis, wherein the third included angle is less than a predetermined angle so that the first portion of the second wavelength light travels through the second angle selective film, and the forth included angle is larger than the predetermined angle so that the second portion of the second wavelength light is reflected by the second angle selective film.

17. The projection device as claimed in claim 16, wherein each of the first wavelength transformer and the second wavelength transformer is selected from a group consisting of a red phosphor and a green phosphor, and the second wavelength transformer is distinct from the first wavelength transformer.

* * * * *